United States Patent [19]
Clarke, Jr. et al.

[11] Patent Number: 5,539,912
[45] Date of Patent: Jul. 23, 1996

[54] COMPUTER SYSTEM HAVING A SELECTABLE MEMORY MODULE PRESENCE DETECT INFORMATION OPTION

[75] Inventors: Grant L. Clarke, Jr., Boca Raton; Peter J. Klim, Deerfield Beach; Mark G. Noll, Lake Worth; Jose A. Olive, Miami, all of Fla.

[73] Assignee: International Business Machines Corporation, Armonk, N.Y.

[21] Appl. No.: 279,308

[22] Filed: Jul. 22, 1994

Related U.S. Application Data

[63] Continuation of Ser. No. 713,174, Jun. 10, 1991, abandoned.

[51] Int. Cl.⁶ .................................................. G06F 13/00
[52] U.S. Cl. ........................ 395/800; 395/405; 395/442; 364/243; 364/964; 364/DIG. 1
[58] Field of Search .................................. 395/425, 800; 364/971, 243, 964

[56] References Cited

U.S. PATENT DOCUMENTS

| | | | |
|---|---|---|---|
| 3,753,232 | 8/1973 | Sporer | 395/494 |
| 4,571,676 | 2/1986 | Mantellina et al. | |
| 4,633,434 | 12/1986 | Scheuneman | 395/550 |
| 4,899,272 | 2/1990 | Fung | 365/230.03 |
| 4,951,248 | 8/1990 | Lynch | 395/402 |
| 4,982,378 | 1/1991 | Matsushita | 365/189.01 |
| 5,012,408 | 4/1991 | Conroy | 395/497.03 |
| 5,038,320 | 8/1991 | Heath et al. | |
| 5,119,486 | 6/1992 | Albonesi | 395/497.03 |
| 5,148,389 | 9/1992 | Hughes | 395/800 |
| 5,155,844 | 10/1992 | Cheng et al. | 395/183.12 |
| 5,175,833 | 12/1992 | Yarkoni et al. | 395/446 |
| 5,237,690 | 8/1993 | Bealkowski | 395/700 |
| 5,241,643 | 8/1993 | Durkin et al. | 395/442 |
| 5,253,357 | 10/1993 | Allen et al. | 395/442 |
| 5,283,877 | 2/1994 | Gastinel et al. | 395/432 |

FOREIGN PATENT DOCUMENTS 0386935  9/1990  European Pat. Off. ........ G06F 13/42

*Primary Examiner*—Parshotam S. Lall
*Assistant Examiner*—Kenneth R. Coulter
*Attorney, Agent, or Firm*—Anthony N. Magistrale

[57] ABSTRACT

A personal computer has two possible memory sizes differing by the maximum number SIMMs that can be installed. Each SIMM stores presence detect bits indicating the size and speed of the SIMM. An I/O controller includes a memory detect port which is used to read the presence detect bits from the SIMMs. The controller further includes a logic circuit that is set in accordance with the memory size to selectively control driving the presence detect bits or empty socket bits onto a data bus.

12 Claims, 4 Drawing Sheets

COMPUTER SYSTEM HAVING A SELECTABLE MEMORY MODULE PRESENCE DETECT INFORMATION OPTION

This is a continuation of application Ser. No. 07/713,174 filed on Jun. 6, 1991, now abandoned.

FIELD OF THE INVENTION

This invention relates to the field of data processing, and, more particularly to novel apparatus for detecting the number and sizes of memory modules in a personal computer in which the maximum number of memory modules in a first model is less than the maximum number of modules in a second model.

BACKGROUND OF THE INVENTION

In connection with the design of a personal computer to be added to the commercially available family of IBM PS/2 personal computers, a requirement or objective existed to detect the number of single, in-line memory modules (SIMMs) installed in the computer when the computer is restarted. The number of installed modules would be either in a first range up to six SIMMs, or in a second range up to sixteen SIMMs. Certain models of the PS/2 personal computers, such as the Models 90 and 95, have memories made up of a number of SIMMs. Each SIMM includes, in addition to the normal random access memory, a register for storing presence detect bits indicating the size and speed of the SIMM. The SIMMs are designed to be plugged into sockets that are driven so that if a socket is empty, a predetermined pattern of presence detect bits, (e.g.,all ones) is provided to indicate the socket is empty. The presence detect information is treated as programmable option select (POS) information that is gathered along with other POS information during a power on self test (POST) and is used to test and verify the configuration of the computer each time the computer is started.

SUMMARY OF THE INVENTION

One of the objects of the invention is to provide an improved memory module presence detection system, operable over two ranges of different maximum numbers of SIMMs.

Another object of the invention is to provide an I/O controller with means to detect the presence of different numbers of memory modules and transmit such information during a power on, self test.

A further object of the invention is to provide an I/O controller chip that supports gathering presence detect setup information in two personal computer models having different sized memory systems.

Still another object is to provide an I/O controller chip that is usable in two different sizes of a computer, which chip provides a cost effective solution to detecting programmable option select memory configuration information.

Briefly, in accordance with the invention, a personal computer has two possible memory sizes differing by the maximum number SIMMs that can be installed. Each SIMM stores presence detect bits indicating the size and speed of the SIMM. An I/O controller includes a memory detect port which is used to read the presence detect bits from the SIMMs. The controller further includes a logic circuit that is set in accordance with the memory size to selectively control driving the presence detect bits or empty socket bits onto a data bus.

DRAWINGS

Other objects and advantages of the invention will be apparent from the following description taken in connection with the accompanying drawings wherein.

DETAILED DESCRIPTION

Figure 1:
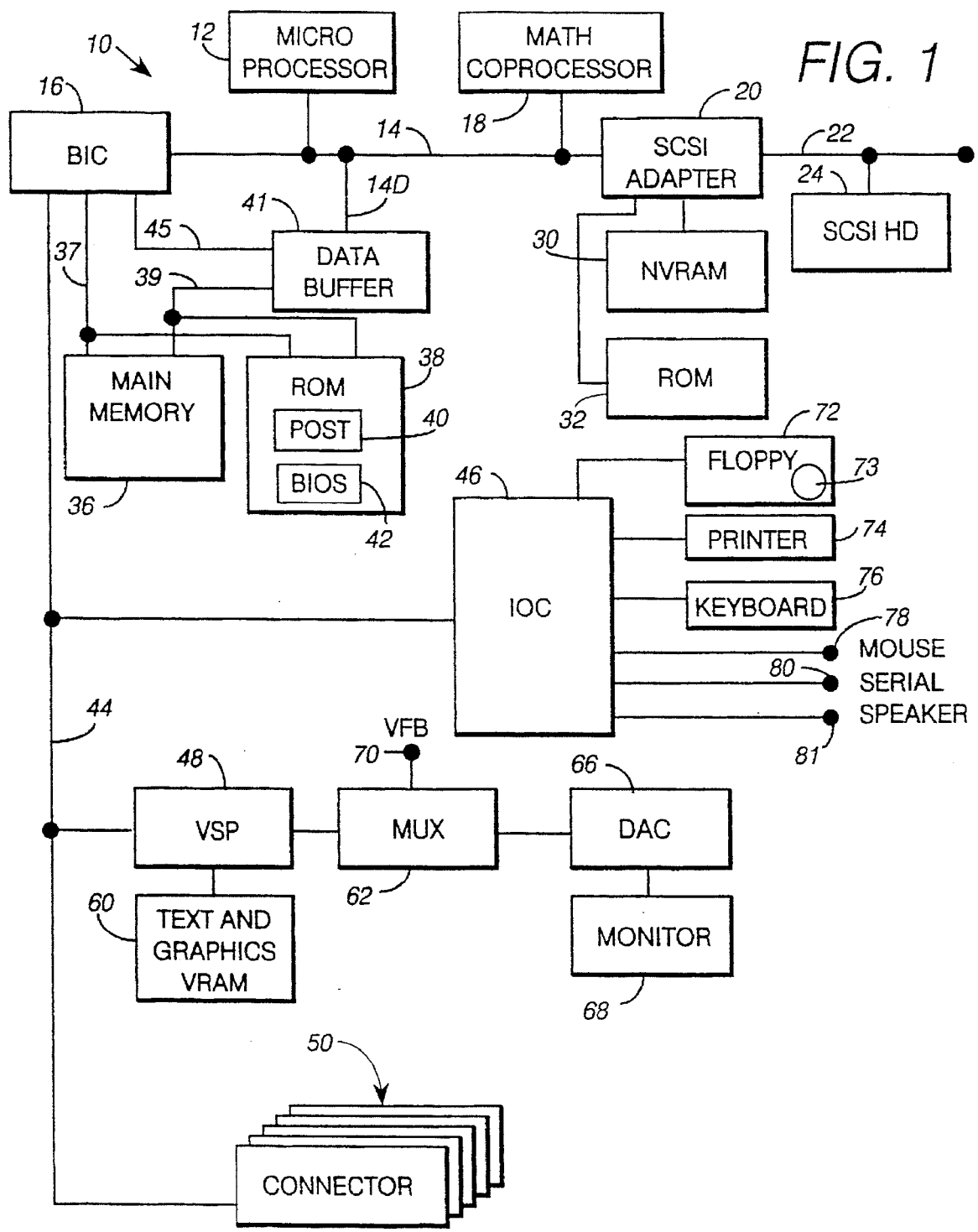
FIG. 1 is a block diagram of a personal computer embodying the invention.

Referring now to the drawings, and first to FIG. 1, there is shown an exemplary data processing system comprising a personal computer 10 operable under an operating system such as PC DOS or OS/2 to execute application programs. Computer 10 comprises a microprocessor 12 connected to a local bus 14 which, in turn, is connected to a bus interface controller (BIC) 16, a math coprocessor 18, and a small computer system interface (SCSI) adapter 20. Microprocessor 12 is preferably one of the family of 80xxx microprocessors, such as an 80386 microprocessor, and local bus 14 includes conventional data, address, and control lines conforming to the architecture of such processor. Adapter 20 is also connected to a SCSI bus 22 which is connected to a SCSI hard drive (HD) 24 designated as the C:drive, the bus also being connectable to other SCSI devices (not shown). Adapter 20 is also connected to a NVRAM 30 and to a read only memory (ROM) 32.

BIC 16 performs two primary functions, one being that of a memory controller for accessing a main memory 36 and a ROM 38. Main memory is a dynamic random access memory (RAM) that comprises a plurality of single, in-line, memory modules (SIMMS) and stores programs and data for execution by microprocessor 12 and math coprocessor 18. ROM 38 stores a POST program 40 and a BIOS 42. POST program 40 performs the primary test, i. e. POST, of the system when computer 10 is restarted by turning the power on or by a keyboard reset. An address and control bus 37 connects BIC 16 with memory 36 and ROM 38. A data bus 39 connects memory 36 and ROM 38 with a data buffer 41 that is further connected to data bus 14D of bus 14. Control lines 45 interconnect BIC 16 and data buffer 41.

The other primary function of BIC 16 is to interface between bus 14 and an I/O bus 44 designed in conformance with Micro Channel (MC) architecture. Bus 44 is further connected to an input/output controller (IOC) 46, a video signal processor (VSP) 48, and a plurality of MC connectors or slots 50. VSP 48 is further connected to a video RAM (VRAM) 60 and a multiplexor (MUX) 62. VRAM 60 stores text and graphic information for controlling what appears on the screen of a monitor 68. MUX 62 is further connected to a digital to analog converter (DAC) 68 and to a connector or terminal 70 that is connectable to a video feature bus (VFB).

DAC 66 is connected to monitor 68 that provides a conventional output screen or display for viewing by a user.

IOC 46 controls operation of plurality of I/O devices including a floppy disc drive 72 designated as the A:drive, a printer 74, and a keyboard 76. Drive 72 comprises a controller (not shown) and a removable floppy disc or diskette 73. IOC 46 also is connected to a mouse connector 78, a serial port connector 80, and a speaker connector 81 which allow various optional devices to be connected into the system.

The architecture of the system as thus far described allows personal computer 10 to be available in two models that differ principally by the amount of memory and adapter expansion capability. A smaller size model has five MC connectors and six SIMM sockets. A larger size model has sixteen MC connectors and sixteen SIMM sockets. Each SIMM would have a size or memory capacity of 1, 2 or 4 megabytes and operate at speeds of 70, 80 or 85 nanoseconds.

Figure 2:
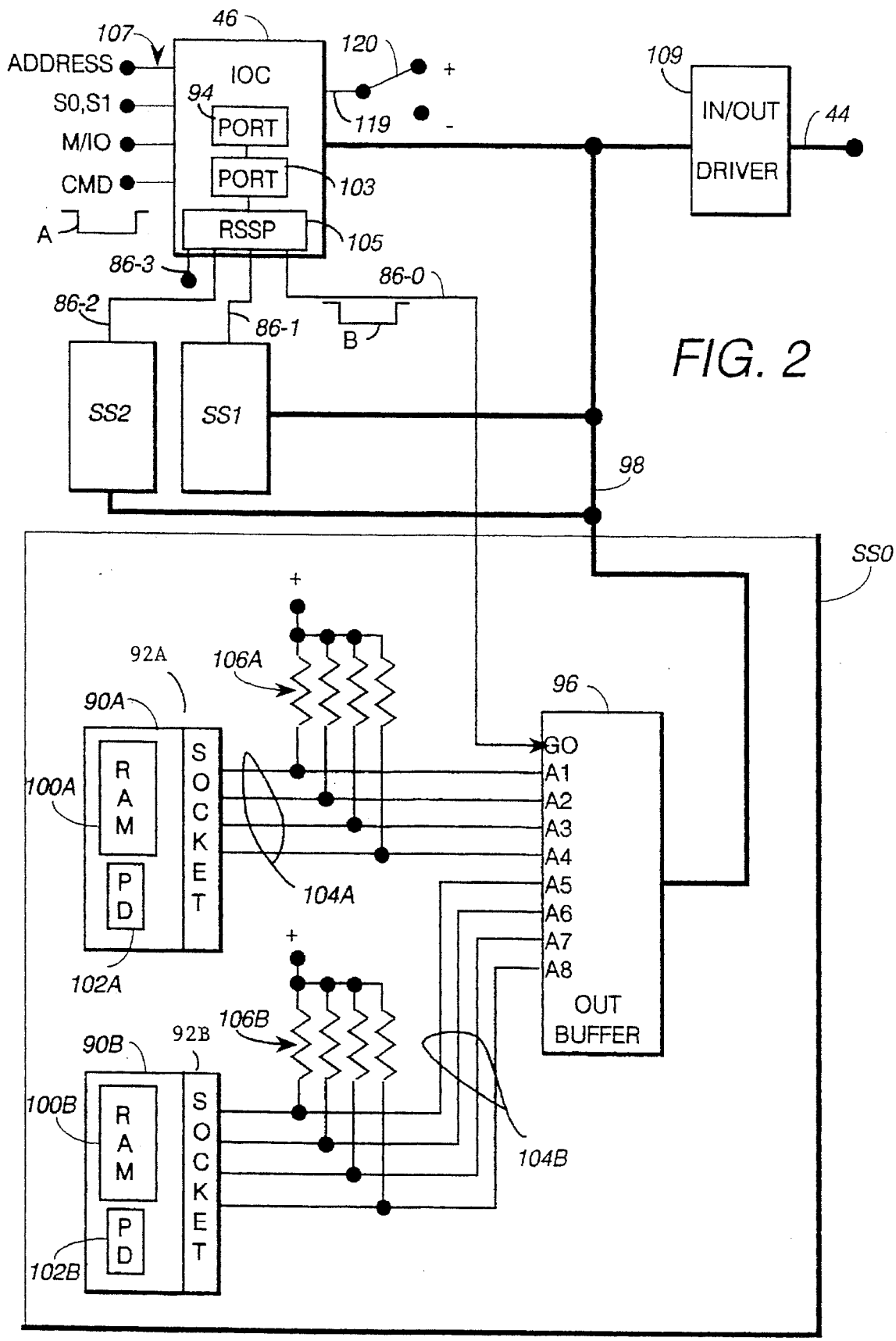
FIG. 2 is a more detailed block diagram of a portion of the computer shown in FIG. 1 illustrating operation of the invention for smaller size memories.

FIG. 2 shows details of the smaller model computer having a memory system for using up to six SIMMs. IOC 46 includes two read/write ports 94 and 103 which are accessed as I/O ports. Port 94 contains an enable/setup register having a bit position which when set provides an enable signal enabling port 103. Port 103 contains a POS register from which information can be read identifying the number and type of SIMMs present in the system. IOC 46 is connected to output lines 86-0 through 86-3. Line 86-3 is open or not used in the smaller model but is used in the larger model as described below relative to FIG. 5. Lines 86-0, 86-1, and 86-2 respectively transmit output signals SELECT 0-2 to three memory subsystems SS0, SS1, and SS2. Each subsystem SS is similar so that only one need be described in detail. Each subsystem SS contains two SIMM sockets 92A and 92B for connection to a pair of SIMMs 90A and 90B. Each subsystem SS also includes a unidirectional out buffer 96 for driving data onto a data bus 98.

SIMM 90A comprises a random access memory (RAM) 100A having a multiplicity of addressable storage locations that form part of main memory in a conventional manner not specially germane to the invention and therefore not shown. SIMM 90A also includes a presence detect register (PD) 102A that provides four bits of information indicating the presence, speed and size of the SIMM. PD 102A is connected through socket 92A to four lines 104A which are further connected to input pins A1–A4 of device 96. Lines 104A are also respectively connected to pullup resistors 106A. If socket 92A is empty, lines 104A are pulled up by resistors 106A so as to produce logic (1) signals indicating the socket is empty, i.e., there is no SIMM present. Obviously, the PD bits use bit combinations other than all ones. Lines 104B are similarly connected except that lines 104B are respectively connected to input pins A5–A8 of buffer 96. Buffer 96 thus forms the PD input signals from the two associated sockets into an eight bit byte that is driven onto and transmitted over data bus 98 in response to an enable signal on input pin GO of buffer 96, as described below.

IOC 46 is connected to the I/O bus by lines 107 that respectively receive ADDRESS, S0, S1, CMD, and M/IO signals from bus 44 for accessing the ports in the IOC. Such signals are the product of conversion by BIC 16 of signals from the microprocessor executing instructions for accessing the ports. IOC 46, in addition to ports 94 and 103 also includes a read strobe steering port (RSSP) 105. During operation, port 94 is first written into by the system to provide an enable signal to port 103. Port 103 is then written into by the system to set up a pattern of bits therein which bits are used during a subsequent port 103 read operation to selectively enable buffer 96 and thereby drive the signals buffered therein onto bus 98. Such signals are received by the system as the read output of port 103. Such signals are read during the active period of the CMD signal, as shown at A (FIG. 2) which produces the enable or drive control signal at B on line 86-0. During a POST read operation, the data signals on bus 98 are driven onto bus 44 through an in/out driver 109. During a write operation to port 103, data is transferred from bus 44 through driver 109 and stored in register 103R (FIG. 4).

Figure 3:
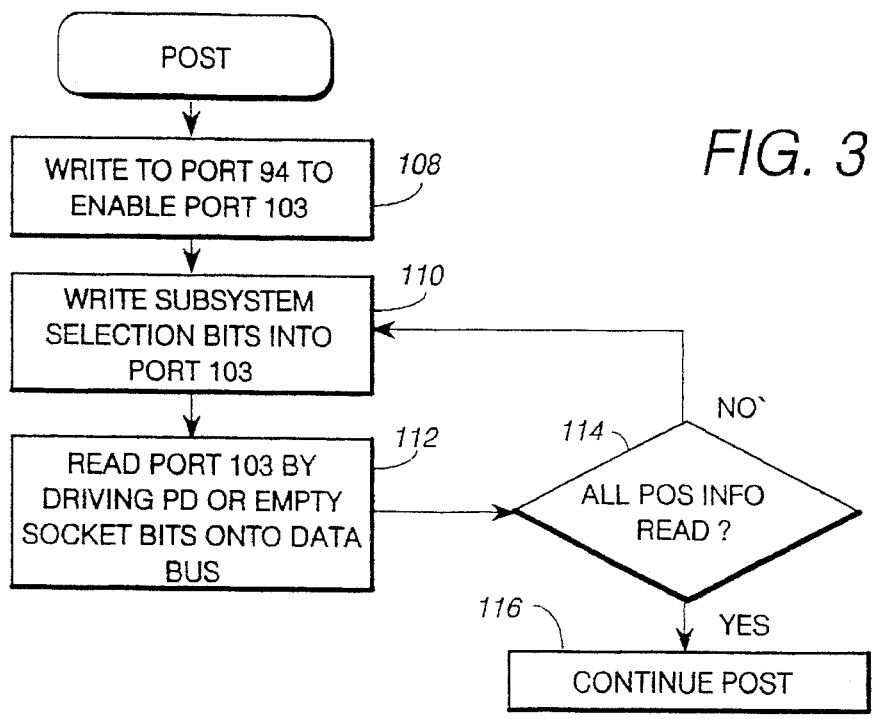
FIG. 3 is a flow diagram illustrating a port read process that occurs during operation of the computer shown in FIG. 1.

Referring to FIG. 3, when computer 10 is restarted, a POST is performed during the course of which POS setup information is read from subsystems SS as follows. First, step 108 writes to port 94 to enable port 103. Step 110 then writes control bits into port 103 for selecting the first subsystem to be read in the next step. Then, step 112 reads port 103 by driving the PD bits or empty socket signals onto data bus 98. Step 114 then determines if all POS information has been read from the subsystems. If not, a branch is made back to step 110 to read the next subsystem. Upon completion, step 116 continues with the rest of the POST in normal manner.

Referring back to FIG. 2, IOC 46 is a semiconductor chip having a pin 119 connectable by a strap 120 to either one of two voltage levels. The strap is set according to computer model size to a positive level for the smaller memory size model or to a negative level for the larger memory size model. Referring to FIG. 4, a line 122 in RSSP is connected to pin 119 to receive the voltage level signal therefrom to set the RSSP to act in a different manner dependent on model selection. Such signal conditions a plurality of selector circuits (SELs) 124 to act as described below. As previously indicated, port 94 includes a register (REG) 94R having a data bit position D7 which when set enables port 103 register REG 103R. Such register has three data bit positions D2–D4 that are connected to logic circuit 124 in RSSP 105.

Figure 4:
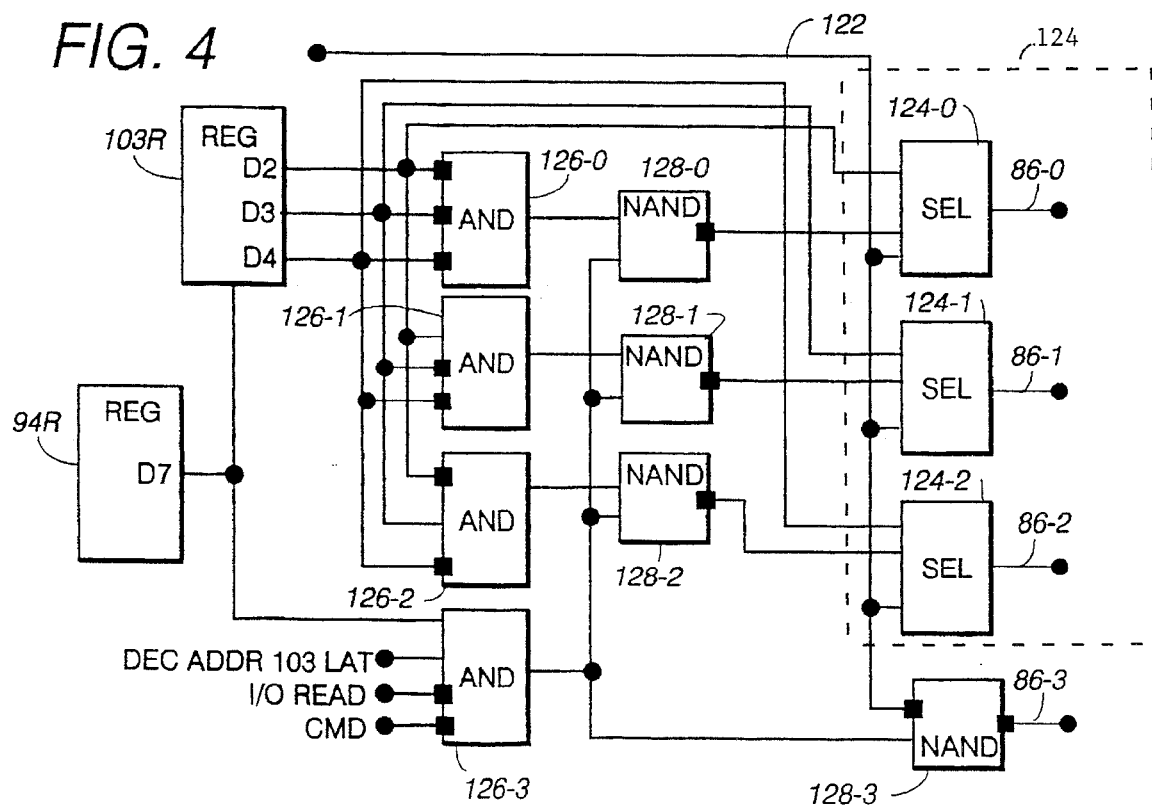
FIG. 4 is a more detailed block diagram primarily illustrating the read strobe steering port shown in FIG. 2.

Logic circuit 124 includes a plurality of AND circuits 126 and a plurality of NAND circuits 128 connected as shown in FIG. 4. The blackened square symbols represent inverted input and output signals. AND circuits 126-0, 126-1, and 126-2 each have three inputs connected to outputs D2–D4 of REG 103R. They also each have one output connected to an input pin of a corresponding one of NAND circuits 128-0, 128-1, and 128-2. Circuits 128 have respective single outputs that are connected to the middle input lines of SELs 124-0, 124-1, and 124-2. These SELs also have upper input pins connected directly to outputs D2–D4 of REG 103R. Dependent on the voltage level on line 122, SELs 124 thus pass either the output signals from the NANDs 128-0, 128-1, and 128-2 when strap 120 is set for the smaller model, or the outputs signals D2–D4 directly from REG 103R when strap 120 is set for the larger model.

When set for the smaller model, logic circuits 124 act as a three-to-one of three decoder. Three combinations of signals are written into bits D2–D4 of reg 103R, a 000, 100, and 010 and in response to such combinations, logic 124 respectively activates lines 86-0, 86-1, and 86-2 one at a time. All other combinations of these bits are rejected by such logic. To illustrate how the logic activates only one line, let us suppose that the bit combination is 000. AND gate 126-0 receives such bits and they are inverted at the inputs to produce an active output. When NAND 128-0 is strobed by the output signal from AND 126-3, it produces an output that is inverted and passed through SEL 124-0 as an active inverted enabling signal. The other AND gates are not activated until the precise bit settings therefor are written into reg 103R. None is activated for other bit combinations.

AND 126-3 has four inputs. One is connected to bit D7 of REG 94R to receive an enabling signal therefrom. Two inputs receive an I/O READ signal and a CMD signal. The fourth input receives a DEC ADDR 103 LAT signal that is active from the beginning of valid address signals on bus 44 to the end of the CMD signal related thereto. AND 126-3 produces an active output signal that is fed to all of the NANDs 128 to control the signals generated thereby. When a port 103 read operation occurs, NANDs 128-0 through 128-2 produce active outputs corresponding to the outputs of the ANDs 126 connected thereto. When strap 120 is set for the larger model and line 122 is thus negative, NAND 128-3 produces an inverted output, enabling signal on line 86-3 in accordance with the output of AND 126-3.

During the POST operations described above, when strap 120 is set for the smaller model and line 122 is positive, REG 103R is written into so that bits D2–D4 are activated only one bit at a time on successive write operations to thereby successively read from each of the subsystems SS0-2. For example, when bit D2 is active, only an active output signal appears on line 86-0 to enable the selective reading of PD bits in subsystem SS0.

Figure 5:
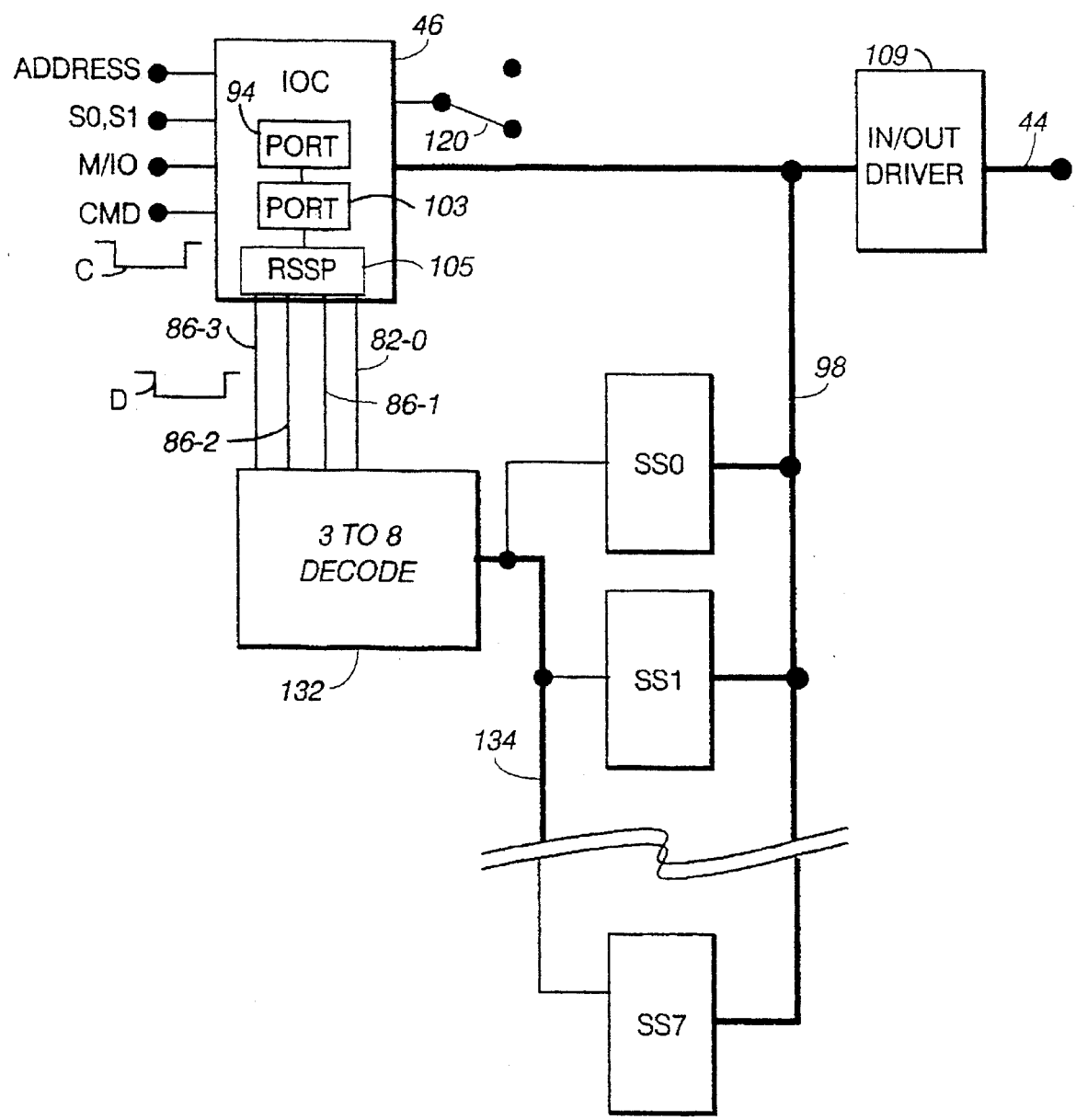
FIG. 5 is a block diagram similar to FIG. 2 illustrating operation of the invention for larger size memories.

Referring to FIG. 5, the larger model includes eight subsystems SS0 through SS7 which are the same as those previously described. Each SS includes two SIMM sockets so that the maximum number of SIMMs is sixteen. Strap 120 is connected to the negative voltage level and this causes RSSP 105 to produce on line 86-3 an enabling signal that is fed into a decoder 132 that is external to IOC 46. The enabling signal is shown at D and has the same active length as that of the CMD signal shown at C. Such decoder is a three-to-eight decoder that has inputs connected to lines 86-0, 86-1, and 86-2 and produces an active output signal on one of eight output lines 134 that are respectively connected to different ones of the subsystems SS. During POST, port 103 is written into on different write cycles with different combinations of three bits D2–D4 for successively reading the different subsystems SS of port 103, to detect the POS information and determine the memory setup of the larger model. If the decoder were to be integrated into IOC 46, additional pins would be required. To avoid adding extra pins, the use of the internal logic or decoding as described particularly with reference to FIG. 4 provides a cost effective solution that allows the same IOC chip design to be used with the different models.

It should be apparent to those skilled in the art that many changes can be made in the details and arrangements of steps and parts without departing from the scope of the invention as defined in the appended claims.

What is claimed is:

1. A personal computer system which is operative to selectively access presence detect (PD) information from each of a first predetermined number of single in-line memory modules (SIMMs) one at a time in a first sequence or each of a second predetermined number of SIMMs one at a time in second sequence depending on whether a memory size select signal is in a first predetermined state or a second predetermined state, said system comprising:

a central processing unit (CPU) capable of executing a power on self test (POST) routine for verifying a configuration of the computer system, a memory coupled to said CPU and comprising a first memory group when said memory size select signal is in said first predetermined state or a second memory group when said memory size select signal is in said second predetermined state, said first memory group comprising said first predetermined number of SIMMs and said second memory group comprising said second predetermined number of SIMMs; said SIMMs including information registers for providing PD information indicating size and speed thereof, a plurality of buffers for receiving said presence detect information from said SIMMs and for selectively providing (1) said PD information from each of said first predetermined number of SIMMs on a data bus in response to first buffer select signals in said first sequence, or (2) said PD information from each of said second predetermined number of SIMMs on said data bus in response to second buffer select signals in said second sequence, means for providing said memory size select signal in said first predetermined state or said second predetermined state, an I/O controller coupled to said memory, the data bus and said means, said I/O controller being operative to receive said memory size select signal, said I/O controller comprising:

a register for receiving and storing a steering control information signal from said CPU under the control of said POST routine, said steering control information signal comprising binary bits for selectively accessing one at a time (1) said PD information from each of said first predetermined number of SIMMs in said first sequence if said memory size select signal is in said first predetermined state, or (2) said PD information from each of said second predetermined number of SIMMs in said second sequence if said memory size select signal is in said second predetermined state, a steering port for receiving said steering control information from said register and said memory size select signal, said steering port selectively enabling one at a time (1) each one of a first predetermined number of said plurality of buffers in said first sequence by generating said first buffer signals when said memory size select signal is in said first predetermined state or (2) each one of a second predetermined number of said plurality of buffers in said second sequence by generating said second buffer select signals when said memory size select signal is in said second predetermined state.

2. The apparatus of claim 1, wherein said steering port includes a first decoder for decoding said steering control information signal and for providing a first buffer select signal, and a selector for selecting one of said steering control information signals or said first buffer select signal based on said memory size select signal, said first buffer select signal comprising buffer select signal for providing said presence detect information on said data bus for said first predetermined number of SIMMs associated with said first memory group.

3. The apparatus of claim 2 further comprising a second decoder coupled to the steering port for decoding said steering control information signal when said steering control information signal is selected by said selector and for providing a second buffer select signal, said second buffer select signal comprising buffer select signal for providing said presence detect information on said data bus for said second predetermined number of SIMMs associated with said second memory group.

4. The apparatus of claim 1, wherein said register comprises an addressable register for receiving said steering control information signal from an input/output bus of said computer system.

5. The apparatus of claim 1, wherein said first predetermined number of SIMMs and said second predetermined number of SIMMs are not equal.

6. The apparatus of claim 1, wherein said first memory group is organized into a first predetermined number of pairs of SIMMs and said second memory group is organized into a second predetermined number of pairs of SIMMs, each one of said plurality of buffers being coupled to one of said pairs of SIMMs and being operative to receive said presence detect information from said one of said pairs of SIMMs and for selectively providing said PD information from said one pair of SIMMs on said data bus in response to an enabling buffer select signal, said steering control information signal within said register is further operative to selectively access, one pair at a time (1) said PD information from each of said first predetermined number of pairs of SIMMs in said first sequence if said memory size select signal is in said first predetermined state, or (2) said PD information from each of said second predetermined number of pairs of SIMMs in said second sequence if said memory size select signal is in said second predetermined state.

7. A personal computer system which is operative to selectively access presence detect (PD) information from each one of a first predetermined number of memory subsystems or each one of a second predetermined number of memory subsystems depending on whether a memory size select signal is in a first predetermined state or a second predetermined state, said system comprising:

a central processing unit (CPU) capable of executing a power on self test (POST) routine for verifying a configuration of the computer system, a memory coupled to said CPU and comprising said first predetermined number of memory subsystems when said memory size select signal is in said first predetermined state or said second predetermined number of memory subsystems when said memory size select signal is in said second predetermined state, each of said memory subsystems including:

first and second SIMM sockets, up to a first and a second SIMM coupled to said first and second sockets respectively, said first and second SIMMs including information registers for providing PD information indicating size and speed thereof, first and second means coupled to said first and second sockets respectively, for providing PD information indicating that a SIMM is not connected to said first or second socket respectively, a buffer coupled to said first and second sockets for (1) receiving said presence detect information from (i) either said first SIMM or said first means and (ii) either said second SIMM or said second means and (2) selectively providing said PD information from said memory subsystem on a data bus in response to an enabling buffer select signal, third means for providing said memory size select signal in said first predetermined state or said second predetermined state, an I/O controller coupled to said memory, the data bus and said third means, said I/O controller being operative to receive said memory size select signal, said I/O controller comprising:

a register for receiving and storing a steering control information signal from said CPU under the control of said POST routine, said steering control information signal comprising binary bits for selectively accessing (1) said PD information from each of said first predetermined number of memory subsystems if said memory size select signal is in said first predetermined state, or (2) said PD information from each of said second predetermined number of memory subsystems if said memory size select signal is in said second predetermined state, a steering port for receiving said steering control information from said register and said memory size select signal, said steering port selectively enabling ( 1 ) each buffer in each one of said first predetermined number of memory subsystems by generating first buffer select signals when said memory size select signal is in said first predetermined state or (2) each buffer in each one of said second predetermined number of memory subsystems by generating second buffer select signals when said memory size select signal is in said second predetermined state.

8. The apparatus of claim 7, wherein said buffer within each of said memory subsystems is further operative to receive said presence detect information from (i) either said first SIMM when said first SIMM is connected to said first socket or said first means when said first SIMM is not connected to said first socket and (ii) either said second SIMM when said second SIMM is connected to said second socket or said second means when said second SIMM is not connected to said second socket.

9. The apparatus of claim 7, wherein said steering port includes a first decoder for decoding said steering control information signal and for providing a first buffer select signal, and a selector for selecting one of said steering control information signals or said first buffer select signal in response to said memory size select signal, said first buffer select signal comprising buffer select signal for providing said presence detect information on said data bus for said first predetermined number of SIMMs associated with said first memory group.

10. The apparatus of claim 9 further comprising a second decoder coupled to the steering port for decoding said steering control information signal when said steering control information signal is selected by said selector and for providing a second buffer select signal, said second buffer select signal comprising buffer select signal for providing said presence detect information on said data bus for said second predetermined number of SIMMs associated with said second memory group.

11. The apparatus of claim 7, wherein said register comprises an addressable register for receiving said steering control information signal from an input/output bus of said computer system.

12. The apparatus of claim 7, wherein said first predetermined number of SIMMs and said second predetermined number of SIMMs are not equal.

\* \* \* \* \*